United States Patent
Yoshino et al.

(10) Patent No.: US 6,799,598 B2
(45) Date of Patent: Oct. 5, 2004

(54) SOLENOID VALVE CIRCUIT FOR AUTOMATIC TRANSMISSION

(75) Inventors: Masayoshi Yoshino, Fuji (JP); Shigeru Ishii, Fuji (JP); Nobufumi Yamane, Fuji (JP)

(73) Assignee: Jatco TransTechnology Ltd. (JP)

( * ) Notice: Subject to any disclaimer, the term of this patent is extended or adjusted under 35 U.S.C. 154(b) by 0 days.

(21) Appl. No.: 10/074,582

(22) Filed: Feb. 12, 2002

(65) Prior Publication Data

US 2002/0129854 A1 Sep. 19, 2002

(30) Foreign Application Priority Data

Feb. 13, 2001 (JP) ........................................ 2001-035354

(51) Int. Cl.⁷ ............................................. G05D 16/20
(52) U.S. Cl. ................................. 137/82; 251/128.08
(58) Field of Search ........................ 137/82; 251/129.08

(56) References Cited

U.S. PATENT DOCUMENTS

| | | | |
|---|---|---|---|
| 5,617,890 A | * | 4/1997 | Brehm et al. ............... 137/82 |
| 6,079,435 A | * | 6/2000 | Franz et al. ................. 137/82 |
| 6,378,545 B1 | * | 4/2002 | Bozkan et al. .............. 137/82 |

* cited by examiner

*Primary Examiner*—Gerald A. Michalsky
(74) *Attorney, Agent, or Firm*—Rossi & Associates

(57) ABSTRACT

In a two-way solenoid vale, a small diameter portion of a nozzle portion is fitted in a small diameter portion receiving part communicating with an output pressure oil passage and a large diameter portion is fitted in a large diameter portion receiving part communicating with a supply pressure oil passage. An opening of a through-hole formed in the nozzle portion faces the output pressure oil passage by way of the small diameter portion receiving part, and an inner end of the through-hole is opened and closed by a plunger and communicates with a drain port. An orifice port communicating with the through-hole is opened to the large diameter portion receiving part and communicates with the supply pressure oil passage. Since the orifice port is disposed in the solenoid valve, a separate plate for an orifice is not required, oil passage is simplified and the solenoid valve can be installed in an optional position. The output pressure characteristics can be adjusted by merely replacing with a solenoid valve having an orifice port of a different diameter.

3 Claims, 3 Drawing Sheets

SOLENOID VALVE CIRCUIT FOR AUTOMATIC TRANSMISSION

BACKGROUND OF THE INVENTION

1. Field of the Invention

The present invention relates to a construction of a solenoid valve circuit for controlling hydraulic pressure in an automatic transmission for a vehicle.

2. Description of the Prior Art

An automatic transmission for a vehicle has the combination of a planetary gear mechanism and a plurality of engaging elements such as clutch, brake or the like which are actuated by hydraulic pressure, and the combination of engagement and release of the engaging elements achieve a plurality of gear positions which respectively provide predetermined gear ratios.

The engaging elements are controlled by controlling line pressure with a shift valve in a control valve unit and by supplying the line pressure to the respective engaging elements. The shift valve is switched by hydraulic pressure controlled from a constant pilot pressure by a solenoid valve which is actuated by a control signal from a shift control system.

The control of pilot pressure by the solenoid valve is performed by controlling drain of a working fluid which has passed through an orifice by the solenoid valve, as in a hydraulic circuit disclosed in Japanese Patent Application Laid-open No. 1-199044.

More specifically, in this hydraulic circuit, line pressure from a manual valve 50, as shown in FIG. 2, is fed to a forward clutch F/C through an oil passage 51 and at the same time fed to a servo apply chamber of a brake B through a shift valve 52 provided in the middle of the oil passage 51. A control port of the shift valve 52 is in communication with an oil passage 55 extending from a pilot pressure valve 54, and an orifice 56 is provided in the middle of the oil passage 55. Moreover, a drain port 57 is provided on the downstream side of the orifice 56, that is, on the side of the shift valve 52, and drain of the working fluid is controlled by a solenoid valve 58. In many cases, the drain port 57 is provided in the solenoid valve 58.

As shown in FIG. 3, the conventional solenoid valve circuit including the orifice 56 and the solenoid valve 58, as described above, is arranged such that a separate plate 63 disposed between an upper body 61 and a lower body 62, which construct the control valve unit, is provided with a small aperture acting as the orifice 56, through which a working fluid supplied from the pilot pressure valve to the lower body 62 is guided to the upper body 61, and such that the solenoid valve 58 is disposed near the orifice 56 of the upper body 61. Moreover, drain of oil pressure on the side of the upper body 61 is controlled by the solenoid valve 58 to act as output pressure.

In the construction of such a solenoid valve circuit, however, the separate plate 63 is disposed between the upper body 61 and the lower body 62 to form the orifice 56, and the upper body 61 and the lower body 62 between which the separate plate 63 is arranged define oil passages. Therefore, even in case where it is desired to put together the pilot pressure valve and the solenoid valve 58 or the like into one of the upper body 61 and the lower body 62, the pilot pressure valve and the solenoid valve 58 need to be arranged opposite each other, having the separate plate 63 between them, whereby the degree of freedom in positions for mounting these valves becomes low. For example, if both the pilot pressure valve and the solenoid valve 58 are placed in the upper body 61, it is required to form a bypass passage leading from the pilot pressure valve to the oil passage on the side of the lower body 62.

Moreover, in case of adjusting the output pressure characteristics, to change the orifice 56, it is required to dismount the solenoid valve circuit and replace the separate plate 63, and thus this adjustment operation is difficult.

SUMMARY OF THE INVENTION

The present invention has been made in view of the aforementioned problem, and it is an object to provide a solenoid valve circuit for an automatic transmission which has a high degree of freedom in positions for mounting a solenoid valve and other valves and is capable of easily adjusting the output pressure characteristics.

According to the first aspect of the present invention, there is provided a solenoid valve circuit for an automatic transmission developing a predetermined output pressure by draining working fluid supplied from a supply pressure oil passage through an orifice, by means of a two-way solenoid valve, wherein said orifice is defined in a nozzle portion of said two-way solenoid valve.

Since the orifice is defined in the nozzle portion of the two-way solenoid valve, other additional members are particularly not needed to form the orifice and also the degree of freedom in the installation position is high. Moreover, the output pressure characteristics may be adjusted by merely replacing with a two-way solenoid valve having an orifice of a different size, as a result of which the adjustment operation is greatly simplified.

Preferably, the two-way solenoid valve has said nozzle portion and a drain port; an oil hole capable of communicating with the drain port and an orifice port being in communication with the oil hole and serving as the orifice are opened to the nozzle portion; an opening of the orifice port faces the supply pressure oil passage; and an opening of the oil hole faces an output pressure oil passage.

After the working fluid from the supply pressure oil passage has passed through the orifice port, output pressure is regulated to a predetermined pressure by properly draining the working fluid from the drain port and is provided from the oil hole to the output pressure oil passage.

Preferably, the oil hole is opened on a head of the nozzle portion; the orifice port is opened to a side of the nozzle portion; the side of the nozzle portion faces the supply pressure oil passage; and the head of the nozzle portion faces the output pressure oil passage.

Since an opening of the oil hole and an opening of the orifice port are arranged separately at the head of the nozzle portion and at the side of the nozzle portion, sealing between the supply pressure oil passage and the output pressure oil passage can be easily achieved.

The above and further objects and features of the invention will be more fully apparent from the following description when the same is considered with reference to the accompanying drawings.

DESCRIPTION OF THE PREFERRED EMBODIMENT

Here will be described the embodiment of the invention with reference to the accompanying drawings.

Figure 1:
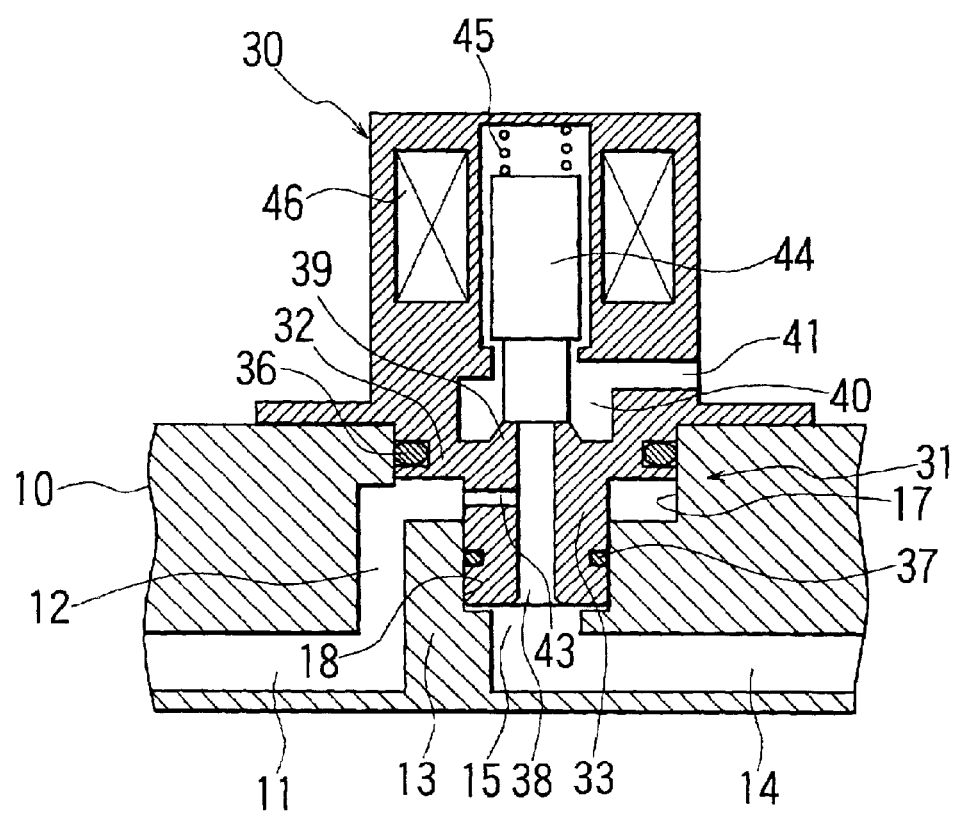
FIG. 1 is a sectional view showing an embodiment of the present invention.
Figure 2:
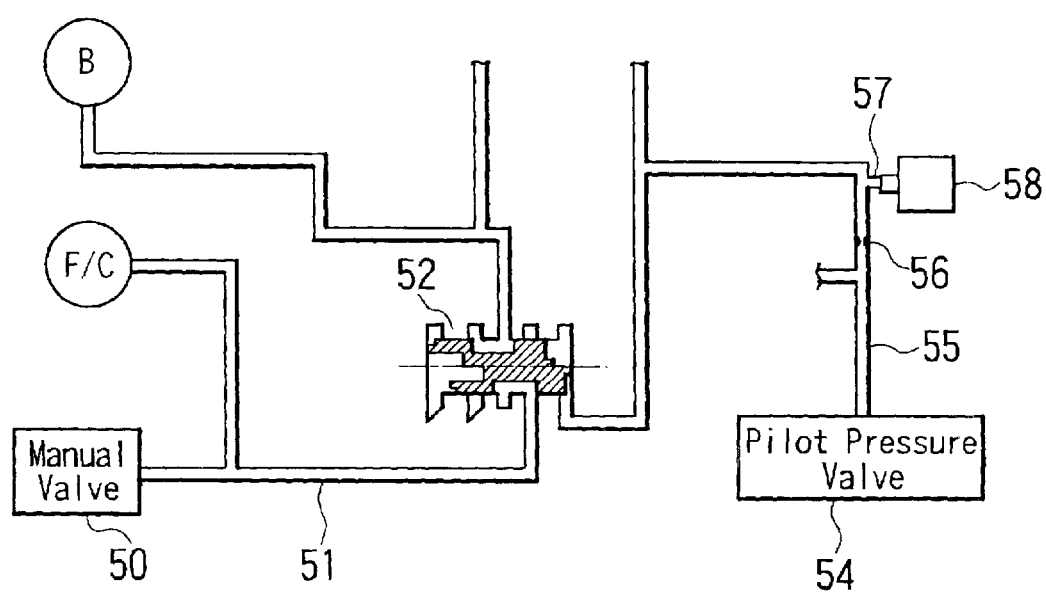
FIG. 2 is a view showing an example of a hydraulic circuit to which the present invention is applied.
Figure 3:
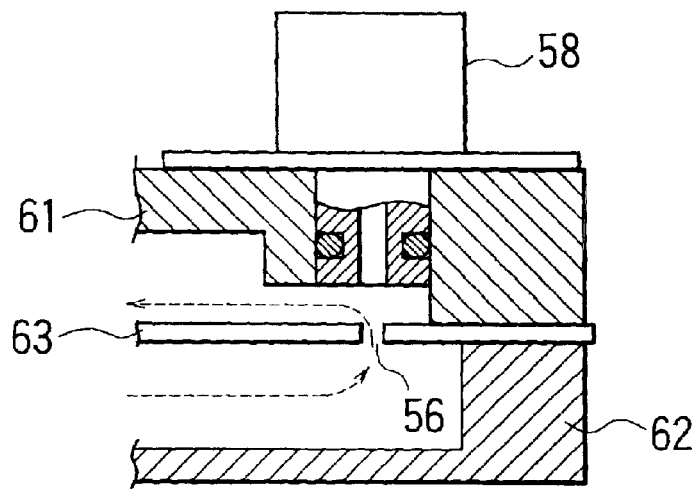
FIG. 3 is a view showing a conventional hydraulic circuit.

FIG. 1 is a sectional view of a solenoid valve circuit according to an embodiment of the present invention.

In a valve body 10, a supply pressure oil passage 11 and an output pressure oil passage 14 are arranged on a substantially straight line, with a wall portion 13 disposed therebetween. This makes it possible to form the oil passages by a single-layered construction but not by a conventional double-layered construction having a separate plate therebetween. The supply pressure oil passage 11 receives working fluid from a not-shown pilot pressure valve.

End portions of the supply pressure oil passage 11 and the output pressure oil passage 14, which are opposite to each other, respectively have rising portions 12 and 15 extending along the wall portion 13 to the direction of an upper surface of the valve body 10.

The upper surface of the valve body 10 has a solenoid valve attaching portion on which a two-way solenoid valve 30 is mounted, with a nozzle portion 31 downward.

The nozzle portion 31 of the two-way solenoid valve 30 is comprised of a large diameter portion 32 and a small diameter portion 33. An end of the small diameter portion 33 is fitted in a small diameter portion receiving part 18 communicating with the rising portion 15 of the output pressure oil passage 14, and the large diameter portion 32 is fitted in a large diameter portion receiving part 17 communicating with the rising portion 12 of the supply pressure oil passage 11. Respective fitted portions are sealed in an oil-tight manner by seal rings 36 and 37 which are held by ring grooves provided in the nozzle portion 31.

In the center of the nozzle portion 31, there is provided a through-hole 38 extending in the axial direction. An end of the through-hole 38 faces the rising portion 15 of the output pressure oil passage 14, and an inner end of the through-hole 38 opens to a plunger chamber 40. The inner end of the through-hold 38 is provided with a valve seat 39 protruding from the periphery. The plunger chamber 40 is in communication with the external via a drain port 41.

The small diameter portion 33 of the nozzle portion 31 is provided with an orifice port 43 in the vicinity of the large diameter portion 32, and the orifice port 43 communicates with the through-hole 38 and is open to the side of the small diameter portion 33. Thereby, the through-hole 38 communicates with the rising portion 12 of the supply pressure oil passage 11 via the large diameter portion receiving part 17 through the orifice port 43.

The end of a plunger 44 biased by a spring 45 abuts on the valve sheet 39, and when electric current is supplied to a coil 46, the plunger 44 moves to open the through-hole 38. Electric current supply from a not-shown oil pressure control unit to the coil 46 is subjected to duty control.

Thus, working fluid from the supply pressure oil passage 11 passes through the orifice port 43 of the two-way solenoid valve 30 and is fed to the through-hole 38 from which the working fluid flows into the output pressure oil passage 14. During this feed, the working fluid in the through-hole 38 is drained by a drain port 41 by opening and closing the inner end of the though-hole 38 by the plunger 44, whereby the working fluid in the output pressure oil passage 14 is regulated to a predetermined pressure by duty control.

Since the solenoid valve circuit of the embodiment is constructed as described above and the two-way solenoid valve 30 performing drain control is provided with the orifice port 43, it is not necessary to form an oil passage into a double-layered construction comprising upper and lower layers between which a separate plate is disposed, as in the prior art. By merely interposing the two-way solenoid valve 30 in the middle of a single-layered oil passage, moreover, the supply pressure oil passage 11 is defined on the upstream side of the orifice port 43 and the output pressure oil passage 14 is defined on the downstream side of the orifice port 43.

Therefore, the oil passage itself becomes simple and short, the degree of freedom in the installation position of the two-way solenoid valve is high, and also resistance to the flow of working fluid becomes low.

Moreover, since the orifice port 43 is disposed in a two-way solenoid valve which is attached to the outside of the valve body 10, the adjustment of the output pressure characteristics may be accomplished by merely replacing with a two-way solenoid valve having an orifice port of a different diameter. Thus, compared to the conventional hydraulic circuit which requires disassembling the control valve unit for exchange of a separate plate disposed between the upper body and the lower body, the output pressure characteristics can be quite easily adjusted.

Furthermore, the through-hole 38 is open at the head of the nozzle portion, the orifice port 43 is open to the side of the nozzle portion, the side of the nozzle portion faces the supply pressure oil passage 11 and the head of the nozzle portion faces the output pressure oil passage 14, as a result of which the positions of respective openings are separated. By interposing a sealing member 37 therebetween, therefore, the supply pressure oil passage 11 can be easily and reliably sealed with respect to the output pressure oil passage 14.

According to this embodiment, the supply pressure oil passage 11 and the output pressure oil passage 14 are formed within the valve body 10 by a boring operation, but these oil passages may be formed by forming grooves on the undersurface of the valve body 10 and covering the undersurface with a plate.

Moreover, the orifice port 43 of the two-way solenoid valve is open to the side of the small diameter portion 33 of the nozzle portion and the through-hole 38 which is opened and closed by the plunger 44 is open on the end face of the small diameter portion 33, but whether any of the through-hole and the orifice is opened at the end face or to the side of the small diameter portion may be optionally selected and a communicating passage with an corresponding oil passage may be set depending on the position of openings.

What is claimed is:

1. A solenoid valve circuit for an automatic transmission, comprising:

a valve body having a fluid supply passage and a fluid output passage substantially arranged in-line; and a two-way solenoid valve mounted to the valve body, the two-way solenoid valve having a nozzle portion interposed between said supply passage and said output passage, wherein said two-way solenoid valve has an orifice port that fluidly communicates with said supply and output passages, and a drain port communicable with said orifice port, and wherein said orifice port is formed at the nozzle portion and has a smaller diameter than said supply passage formed at the valve body.

2. A solenoid valve circuit for an automatic transmission according to claim 1, wherein said nozzle portion of said two-way solenoid valve includes a through passage that communicates with said orifice port and communicable with said drain port, and wherein an opening of said orifice port faces said supply passage, and an opening of said through passage faces said output passage.

3. A solenoid valve circuit for an automatic transmission according to claim 2, wherein said through passage extends substantially axially of the nozzle portion and said orifice port extends substantially perpendicularly to the through passage, through a side of the nozzle portion.

* * * * *